(12) United States Patent
Huang et al.

(10) Patent No.: US 11,662,604 B2
(45) Date of Patent: May 30, 2023

(54) GLASSES

(71) Applicant: PEGATRON CORPORATION, Taipei (TW)

(72) Inventors: Mao-Hsiang Huang, Taipei (TW); Wei-Chih Hsu, Taipei (TW); Pen-Uei Lu, Taipei (TW)

(73) Assignee: PEGATRON CORPORATION, Taipei (TW)

(*) Notice: Subject to any disclaimer, the term of this patent is extended or adjusted under 35 U.S.C. 154(b) by 207 days.

(21) Appl. No.: 16/925,458

(22) Filed: Jul. 10, 2020

(65) Prior Publication Data
US 2021/0048685 A1 Feb. 18, 2021

(30) Foreign Application Priority Data
Aug. 13, 2019 (TW) ................................. 108128812

(51) Int. Cl.
*G02C 5/12* (2006.01)
(52) U.S. Cl.
CPC .................................. *G02C 5/122* (2013.01)
(58) Field of Classification Search
CPC ..................................................... G02C 5/122
See application file for complete search history.

(56) References Cited

U.S. PATENT DOCUMENTS

| | | | | |
|---|---|---|---|---|
| 5,971,538 A | * | 10/1999 | Heffner | G02C 5/122 351/137 |
| 7,048,371 B1 | * | 5/2006 | Moore | G02C 5/00 351/103 |
| 7,631,967 B1 | * | 12/2009 | Huang | G02C 5/12 351/86 |
| 8,931,894 B1 | | 1/2015 | Chen | |

(Continued)

FOREIGN PATENT DOCUMENTS

| CN | 202583611 U | 12/2012 |
|---|---|---|
| CN | 203981994 U | 12/2014 |

(Continued)

OTHER PUBLICATIONS

European Office Action, dated Jan. 13, 2021, cited in counterpart application No. 20188618.1-1020.

*Primary Examiner* — William R Alexander
*Assistant Examiner* — Sharrief I Broome
(74) *Attorney, Agent, or Firm* — McClure, Qualey & Rodack, LLP (57) ABSTRACT

Glasses have a groove provided in a vertical direction on a bridge of a glasses frame. A support section of a nose pad of the glasses is connected to an end portion of a positioning section of the nose pad, the positioning section is slidably disposed in the groove, and the positioning section has a plurality of locking slots and a limiting slot. An adjustment mechanism of the glasses is disposed at the glasses frame, and a pressing member of the adjustment mechanism is (Continued)

disposed perpendicular to the groove, where one end of the pressing member protrudes from one side of the groove, and the other end penetrates through the groove and the limiting slot. A positioning member of the adjustment mechanism is connected to the other end of the pressing member. The positioning member moves from a positioning position to a release position by pushing of the pressing member.

11 Claims, 11 Drawing Sheets

(56) References Cited

U.S. PATENT DOCUMENTS

| | | | |
|---|---|---|---|
| 2002/0067461 A1 | 6/2002 | Bell | |
| 2007/0263168 A1* | 11/2007 | Cohen | G02C 7/086 |
| | | | 351/135 |
| 2014/0375948 A1* | 12/2014 | Chen | G02C 5/124 |
| | | | 351/137 |
| 2015/0346511 A1* | 12/2015 | Osterhout | G02C 11/10 |
| | | | 351/119 |
| 2018/0059434 A1* | 3/2018 | Heisey | G02B 27/0172 |

FOREIGN PATENT DOCUMENTS

| | | |
|---|---|---|
| TW | 201913184 A | 4/2019 |
| WO | 2018044537 A1 | 3/2008 |
| WO | 2015164276 A1 | 10/2015 |
| WO | 2018066245 A1 | 4/2018 |
| WO | 2019058875 A1 | 3/2019 |

\* cited by examiner

GLASSES

CROSS-REFERENCE TO RELATED APPLICATION

This non-provisional application claims priority under 35 U.S.C. § 119(a) to Patent Application No. 108128812 filed in Taiwan, R.O.C. on Aug. 13, 2019, the entire contents of which are hereby incorporated by reference.

BACKGROUND

Technical Field

The application relates to glasses, and in particular, glasses having an adjustable nose pad mechanism.

Related Art

Generally, during designing of a virtual reality device or an augmented reality device, due to relatively large differences in nose shape and nose bridge height between westerners and easterners, the male and the female, or the like, different devices are designed respectively based on the average value of each group, or the position of the nose pad of the glasses device is adjusted based on data that may fit most people, to expect the glasses device that is suitable for most people to wear.

However, due to the relatively large differences, if the majority of multiple groups are to be satisfied, multiple types of glasses may need to be designed. For example, consumers for household purpose or companies for commercial purpose may need to purchase multiple glasses of different sizes based on different actual users (for example, adults and children at home, or consumers of different generations and ages who come to visit). The price of a pair of virtual reality glasses or a pair of augmented reality glasses is relatively high, and therefore, consumers' desire to purchase may be reduced.

SUMMARY

To resolve the foregoing problem to obtain glasses capable of adjusting a position of a nose pad to meet needs of most people at the same time, an embodiment of the application provides glasses including a glasses frame, a nose pad, and an adjustment mechanism. The glasses frame includes a bridge, where the bridge has a groove provided in a vertical direction. The nose pad includes a positioning section and a support section, where the support section is connected to an end portion of the positioning section, the positioning section is slidably disposed in the groove, and the positioning section has a plurality of locking slots and a limiting slot. The adjustment mechanism is disposed at the glasses frame, and the adjustment mechanism includes a pressing member and a positioning member. The pressing member is disposed perpendicular to the groove, where one end of the pressing member protrudes from one side of the groove, and the other end penetrates through the groove and the limiting slot. The positioning member is disposed at the glasses frame and connected to the other end of the pressing member, where the positioning member is capable of moving from a positioning position to a release position by pushing of the pressing member. When the positioning member is located at the positioning position, the positioning member is inserted into one of the locking slots, and when the positioning member moves to the release position, the nose pad is capable of moving in the groove.

Therefore, the position of the nose pad can be adjusted up and down by using the adjustable mechanism disposed at the glasses frame. In this way, only a single device is needed to meet users with different nose shapes and nose bridge heights. For commercial use, there is no need to purchase more glasses devices or replace nose pads of different sizes for various consumers with different nose shapes and nose bridge heights. In addition, an adjustment method is very simple, one only needs to press the pressing member and adjust the nose pad to a desired position, and then release the pressing member and drive the positioning member to return to an original position to be inserted into the nose pad to fix the nose pad to the desired position, thereby completing the adjustment of the nose pad.

In some embodiments, the adjustment mechanism may further include a first elastic element disposed between the glasses frame and the positioning member, to provide the positioning member with an elastic force. After the pressing member is pressed to push the positioning member, there is no need to drive the positioning member to return to the original position by additionally operating the pressing member, but instead, an elastic force can be provided by the first elastic element to the positioning member, so that the positioning member moves to the positioning position. During operation, the user only need to release the pressing member to make the positioning member return to the positioning position under the action of the first elastic element.

In some embodiments, a bottom surface of an end portion of the positioning member has a first bevel, and a bottom surface of each of the locking slots has a second bevel. When the positioning member is inserted into one of the locking slots, the first bevel corresponds to the second bevel. Meanwhile, provided with the aforementioned elastic element, before wearing the glasses, the user may first press the pressing member and adjust the nose pad to a longest state. Then after the user wears the glasses, by pressing the glasses down, the nose applies a force to the nose pad, so that the nose pad can be pushed up. In this case, the second bevel at the bottom of the locking slots will push the first bevel on the positioning member, so that the positioning member is pushed to the release position, and the nose pad is capable of moving up. When the nose pad moves up until the positioning member corresponds to another pair of locking slots, the positioning member returns to the positioning position under the elastic force of the first elastic element, so that the positioning member is inserted into the locking slots. If the nose pad is still not adjusted to the correct position at this time, one can continue to push the nose pad and repeat the above action until the nose pad is in the desired position.

In some embodiments, the adjustment mechanism may further include a second elastic element disposed in the groove and disposed between the glasses frame and the positioning section of the nose pad, to provide the positioning section with an elastic force. The second elastic element is disposed between the glasses frame and the positioning section of the nose pad, so that a force of pushing out may be provided to the nose pad. In this way, after the pressing member is pressed, the nose pad does not need to be manually pulled out, and the nose pad will be pushed out of the groove under the elastic force of the second elastic element, which can save a procedure for the user to operate the adjustment.

In some embodiments, the positioning member includes a pushing part and an insertion part. The pushing part abuts the pressing member. The insertion part is connected to the pushing part, and the insertion part is perpendicular to the pushing part. When the positioning member is located at the positioning position, the insertion part is inserted into one of the locking slots. Therefore, by providing the pushing part, the pressing member can be reliably pressed on the positioning member. The insertion part may be disposed according to the shape and position of the locking slot, so that the positioning member can be more easily and accurately inserted into the locking slot.

In the foregoing embodiments, the pressing member may include a convex part, the pushing part includes a through hole, and the convex part correspondingly penetrates through the through hole. In this way, the pressing member is reliably connected to the positioning member, and the pressing member can reliably push the positioning member, or drive the positioning member to return to the positioning position.

In the foregoing embodiments, the insertion part extends from left and right sides of the pushing part, and the locking slots are provided on left and right sides of the limiting slot. When the positioning member is located at the positioning position, the insertion part is correspondingly inserted into two locking slots located at the same height on the left and right sides of the limiting slot.

In some of the foregoing embodiments, a bottom surface of an end portion of the insertion part has a first bevel, and a bottom surface of each of the locking slots has a second bevel. When the insertion part is inserted into one of the locking slots, the first bevel corresponds to the second bevel. As mentioned above, by providing the first bevel and the second bevel, after wearing the glasses, by pressing the glasses down, the nose applies a force to the nose pad, so that the nose pad can be pushed up. In this case, the second bevel at the bottom of the locking slot will push the first bevel on the positioning member, so that the positioning member is pushed to the release position, and the nose pad is capable of moving up.

In some embodiments, the positioning member may include a plug-in part and a stopper. The plug-in part abuts the pressing member, and the stopper is connected to the plug-in part and extends from two sides of the insertion part. When the positioning member is located at the positioning position, the plug-in part is inserted into one of the locking slots, and the stopper abuts against the positioning section. In addition to the aforementioned additional providing of the pushing part for the pressing member to push, the pressing member may also directly abut against the plug-in part. Since omitting the pushing part means that there is no mechanism that can abut against the positioning section to stop the positioning member at the positioning position, by providing the stopper, the function of abutting against the positioning section to stop may also be provided to the positioning member.

In some of the foregoing embodiments, a bottom surface of an end portion of the plug-in part has a third bevel, and a bottom surface of each of the locking slots has a fourth bevel. When the plug-in part is inserted into one of the plurality of locking slots, the third bevel corresponds to the fourth bevel. As mentioned above, by providing the third bevel and the fourth bevel, after wearing the glasses, by pressing the glasses down, the nose applies a force to the nose pad, so that the nose pad can be pushed up. In this case, the fourth bevel at the bottom of the locking slot will push the third bevel on the positioning member, so that the positioning member is pushed to the release position, and the nose pad is capable of moving up.

In some of the foregoing embodiments, the pressing member and the positioning member are an integral structure, the positioning section further comprises an assembly port provided above the limiting slot, and the pressing member penetrates through the assembly port to the limiting slot. Because the pressing member and the positioning member are an integral structure, only one element needs to be made in production, and assembly of the adjustment structure can be completed by assembling a single element during assembly, which can reduce procedures during assembling, a number of elements, and production time.

The detailed features and advantages of the application are described in detail in the following embodiments. The content is sufficient to enable any person skilled in the art to understand and implement the technical content of the application. In addition, based on the content, claims, and drawings disclosed in this specification, any person skilled in the art may easily understand the objectives and advantages related to the application.

DETAILED DESCRIPTION OF THE EMBODIMENTS

Figure 1:
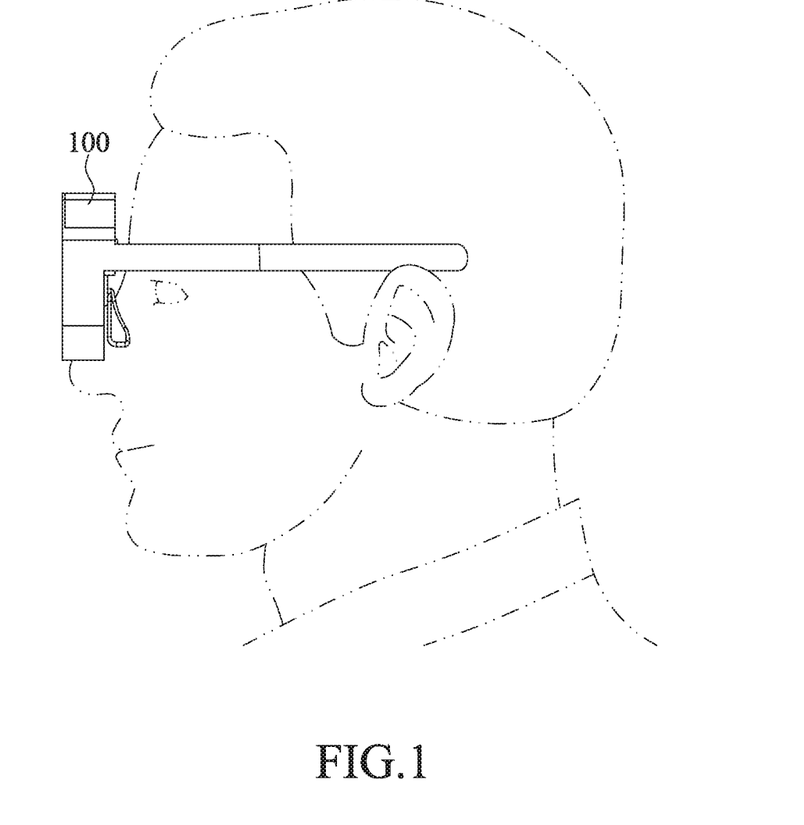
FIG. 1 is a schematic diagram of wearing glasses according to an embodiment of the application.
Figure 2:
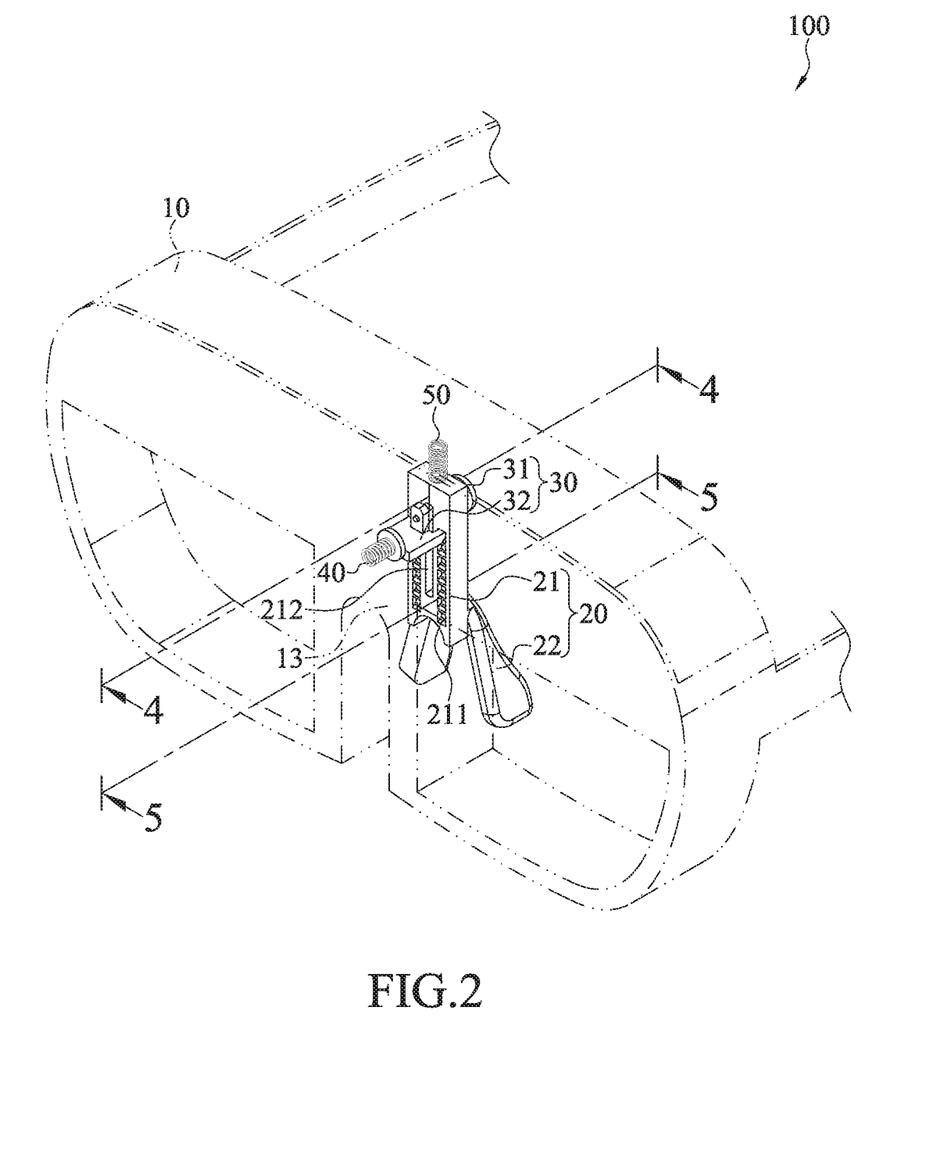
FIG. 2 is a partial three-dimensional perspective view of the glasses according to an embodiment of the application.
Figure 3:
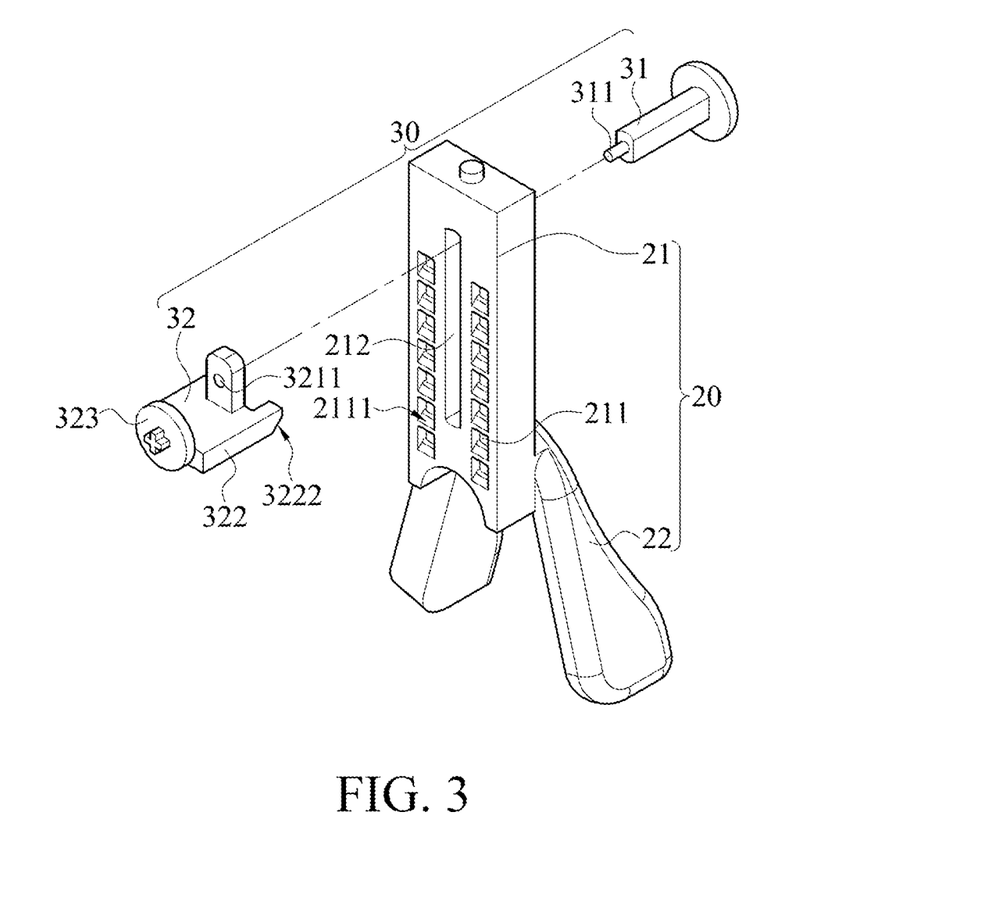
FIG. 3 is a partial exploded view of the glasses according to an embodiment of the application.
Figure 4:
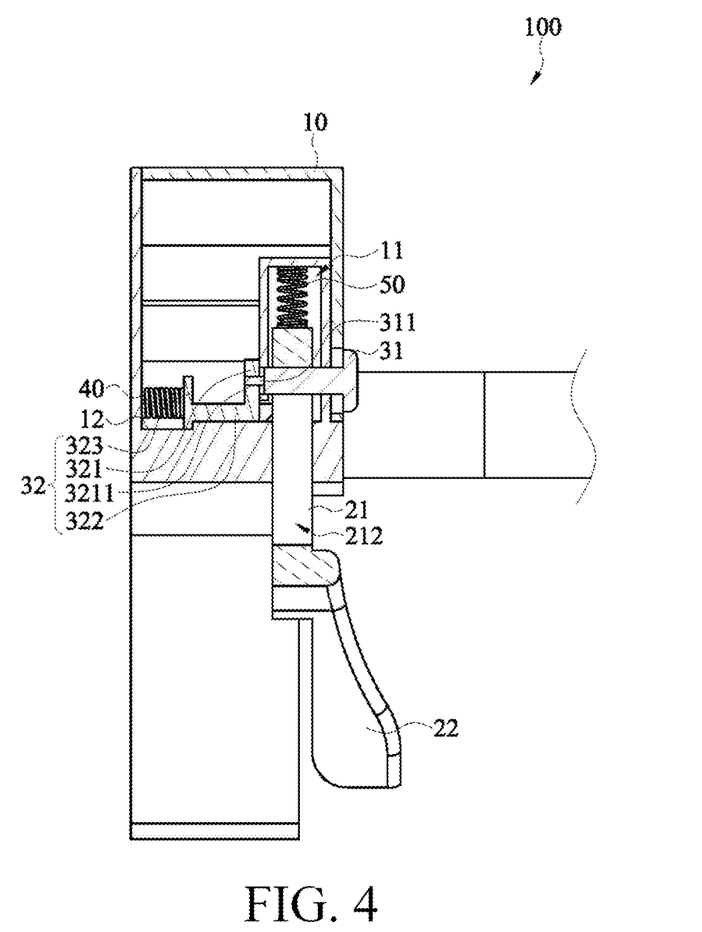
FIG. 4 is a cross-sectional view of the glasses taken along line 4-4 in FIG. 2 according to an embodiment of the application.
Figure 5:
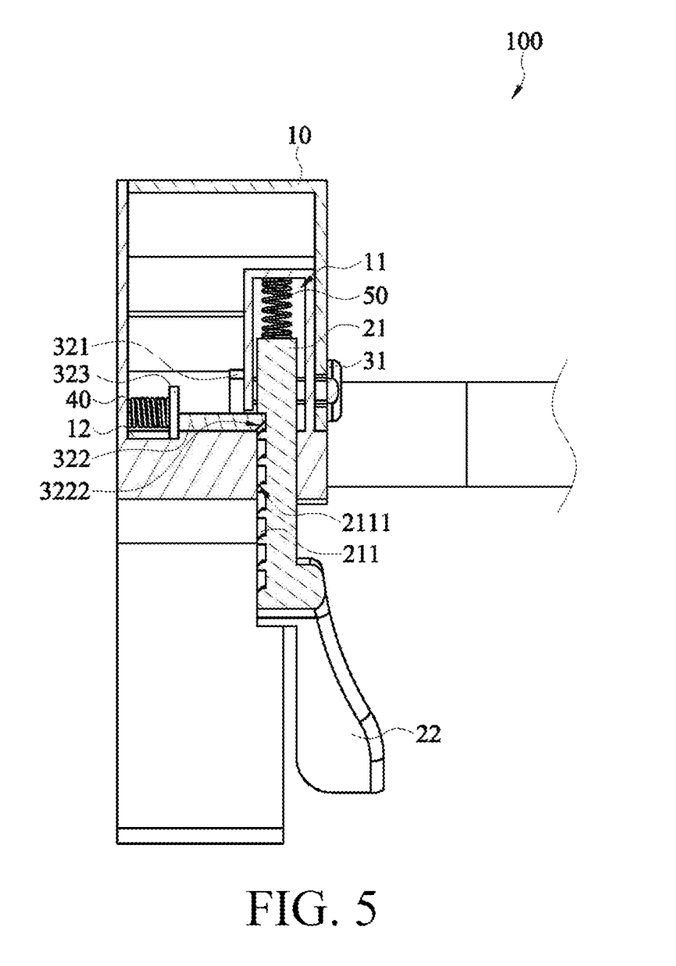
FIG. 5 is a cross-sectional view of the glasses taken along line 5-5 in FIG. 2 according to an embodiment of the application.
Figure 6:
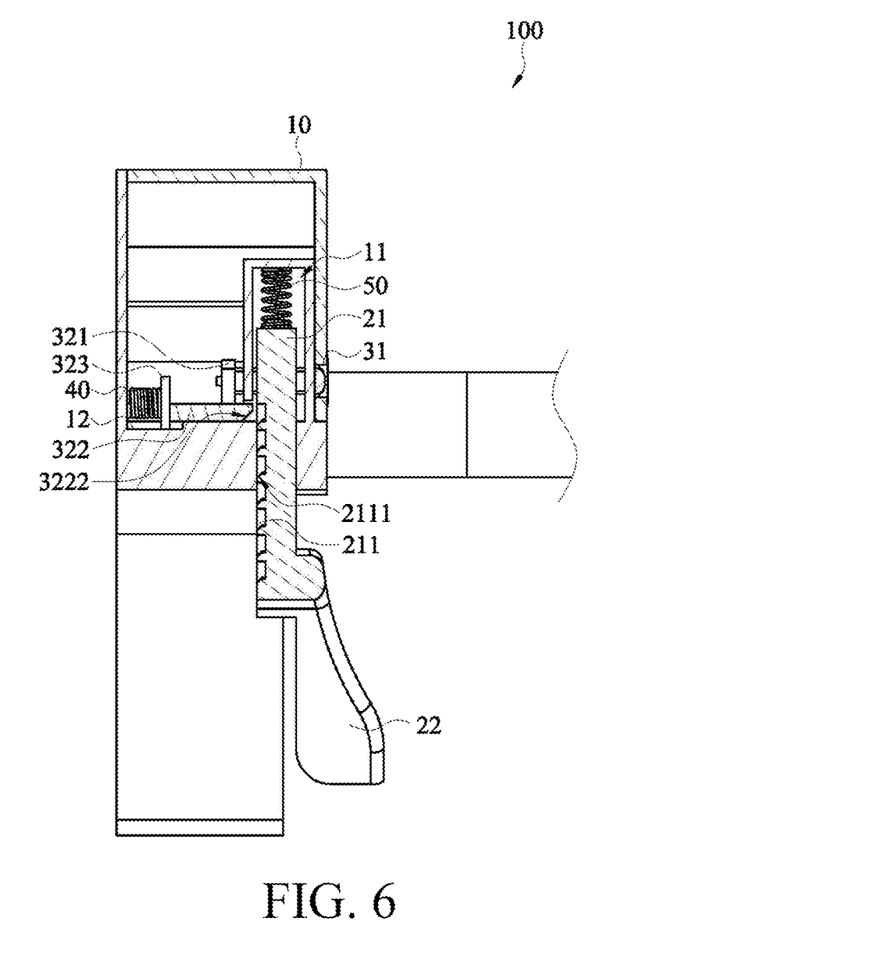
FIG. 6 is a cross-sectional view of pressing a pressing member to move a positioning member to a release position of the glasses according to an embodiment of the application.
Figure 7:
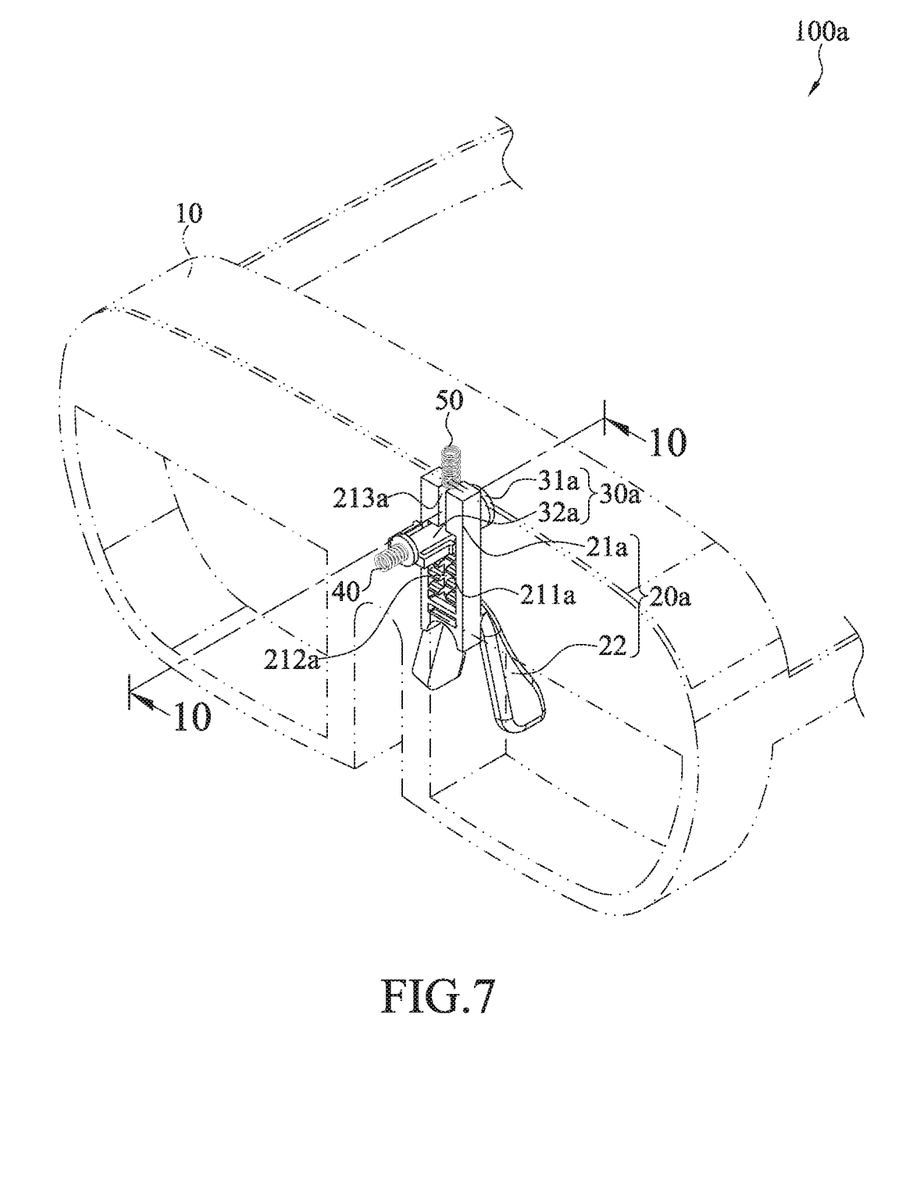
FIG. 7 is a partial three-dimensional perspective view of glasses according to another embodiment of the application.

Referring to FIG. 1 to FIG. 6, FIG. 1 is a schematic diagram of wearing glasses according to an embodiment of the application; FIG. 2 is a partial three-dimensional perspective view of the glasses according to an embodiment of the application; FIG. 3 is a partial exploded view of the glasses according to an embodiment of the application; FIG. 4 is a cross-sectional view of the glasses taken along line 4-4 in FIG. 2 according to an embodiment of the application; FIG. 5 is a cross-sectional view of the glasses taken along line 5-5 in FIG. 2 according to an embodiment of the application, and FIG. 6 is a cross-sectional view of pressing a pressing member to move a positioning member to a release position of the glasses according to an embodiment of the application.

As shown in FIG. 1, glasses 100 of this embodiment may be generally worn glasses 100, and may also be virtual reality glasses, augmented reality glasses, or the like. Glasses for different users to wear need to be provided.

As shown in FIG. 2 and FIG. 3, the glasses 100 of this embodiment include a glasses frame 10, a nose pad 20, and an adjustment mechanism 30. The glasses frame 10 includes a bridge 13, where the bridge 13 has a groove 11 provided in a vertical direction. The bridge 13 refers to a connecting member of the glasses frame 10 located between similar lens structures on two sides. The vertical direction herein refers to an up-down direction that is perpendicular to a horizontal plane direction relative to the ground when the glasses 100 are in a wearing state shown in FIG. 1. The nose pad 20 includes a positioning section 21 and a support section 22, where the support section 22 is connected to an end portion of the positioning section 21. The support section 22 is a mechanism in contact with the nose. As shown in FIG. 2 and FIG. 4, the support section 22 is in a common nose pad shape and has two symmetrical nose pads on the left and right sides.

As shown in FIG. 3, the positioning section 21 is slidably disposed in the groove 11. As shown in FIG. 2 and FIG. 4, the positioning section 21 has a plurality of locking slots 211 and a limiting slot 212. In this embodiment, the plurality of locking slots 211 is arranged in pairs of two on the left and right sides, and a plurality of pairs is arranged from top to bottom. The limiting slot 212 is provided between the locking slots 211 on the left and the locking slots 211 on the right. The limiting slot is a vertical channel from top to bottom, which is used to allow the nose pad 20 to slide up and down without being stopped by a pressing member 31 of the adjustment mechanism 30. Details are provided below.

The adjustment mechanism 30 is disposed at the glasses frame 10, and the adjustment mechanism 30 includes a pressing member 31 and a positioning member 32. The pressing member 31 is disposed perpendicular to the groove 11, where one end of the pressing member 31 protrudes from one side of the groove 11, and the other end penetrates through the groove 11 and the limiting slot 212. As shown in FIG. 3, the pressing member 31 of this embodiment is an element having an oblate shape at one end and a long cylindrical shape at the other end. As shown in FIG. 2 and FIG. 4, during the assembly, the pressing member 31 penetrates in a direction perpendicular to the groove 11 (that is, a direction parallel to the horizontal plane), and correspondingly penetrates into the position of the limiting slot 212. Because of the limiting slot 212, when the nose pad 20 moves up and down, the pressing member 31 is located at the position of the limiting slot 212, so that the nose pad 20 will not be unable to move up and down because of the pressing member 31 that penetrates through.

In addition, a length of the limiting slot 212 may also limit a range in which the nose pad 20 is capable of moving up and down. When the nose pad 20 moves down until an upper boundary of the limiting slot 212 abuts against the pressing member 31, the nose pad 20 cannot continue to move down. Similarly, when the nose pad 20 is pushed up and the nose pad 20 moves up until a lower boundary of the limiting slot 212 abuts against the pressing member 31, the nose pad 20 cannot continue to move up. In this way, problems such as the nose pad 20 being excessively pulled out and damaged can also be avoided.

The pressing member 31 has an oblate end that protrudes from the inside of the glasses frame 10, so that a user can press and operate the pressing member 31, while an outward appearance of the glasses frame 10 can be maintained.

Referring to FIG. 2 to FIG. 6, the positioning member 32 is disposed at the glasses frame 10 and connected to the other end of the pressing member 31, where the positioning member 32 is capable of moving from a positioning position to a release position by pushing of the pressing member 31; when the positioning member 32 is located at the positioning position, the positioning member 32 is inserted into one of the locking slots 211, and when the positioning member 32 moves to the release position, the nose pad 20 is capable of moving in the groove 11 along the limiting slot 212 without limiting of the adjustment mechanism 30.

As shown in FIG. 4 and FIG. 5, at the beginning, the positioning member 32 is located at the positioning position. At this time, the pressing member 31 is only connected to the positioning member 32 and does not push the positioning member 32, and the positioning member 32 is inserted into one pair of locking slots 211 of the plurality of locking slots 211. In another implementation, the locking slots 211 may be provided only on a single side, and the positioning member 32 is inserted into one of the locking slots 211.

FIG. 6 is a schematic action diagram of the pressing member 31 being pressed. The positioning member 32 is capable of moving from the positioning position to the release position by pushing of the pressing member 31. When the positioning member 32 moves to the release position, the nose pad 20 is capable of moving in the groove 11 along the limiting slot 212 relative to the pressing member 31 without limiting of the adjustment mechanism 30 until the positioning member 32 corresponds to a position of one of the locking slots 211. After the nose pad 20 moves to the position desired by the user, the positioning member 32 moves to the positioning position, so that the nose pad 20 can be positioned at the desired position. When a first elastic element 40 is not provided, the displacement of the positioning member 32 can still be driven by operating the pressing member 31.

The position of the nose pad 20 can be adjusted up and down by providing the adjustable mechanism disposed at the nose pad 20. In this way, only a single device is needed to meet users with different nose shapes and nose bridge heights. For commercial use, there is no need to purchase more glasses 100 or replace nose pads 20 of different sizes for various consumers with different nose shapes and nose bridge heights. In addition, an adjustment method of the glasses 100 of this embodiment is very simple, one only needs to press the pressing member 31 and adjust the nose pad 20 to a desired position, and then release the pressing member 31 and drive the positioning member 32 to return to an original position to be inserted into the locking slots 211 of the nose pad 20 to fix the nose pad 20 to the desired position, thereby completing the adjustment of the nose pad 20.

Further, referring to FIG. 2 and FIG. 4, the adjustment mechanism 30 further includes a first elastic element 40 disposed between the glasses frame 10 and the positioning member 32, to provide the positioning member 32 with an elastic force. As shown in FIG. 4, one end of the first elastic element 40 abuts against the glasses frame 10, and the other end abuts against a rear side of the positioning member 32. When the positioning member 32 moves to the release position by pushing of the pressing member 31 shown in FIG. 5, the positioning member 32 presses the first elastic element 40, so that the first elastic element 40 generates an elastic force due to compression. When the pushing force of the pressing member 31 disappears, the positioning member 32 is pushed to the positioning position under the elastic force of the first elastic element 40. During operation, the user only need to release the pressing member 31 to make the positioning member 32 return to the positioning position under the action of the first elastic element 40.

Referring to FIG. 5, a bottom surface of an end portion of the positioning member 32 has a first bevel 3222, and a bottom surface of each of the locking slots 211 has a second bevel 2111. When the positioning member 32 is inserted into one of the locking slots 211, the first bevel 3222 corresponds to the second bevel 2111. Before wearing the glasses, the user may first press the pressing member 31 and adjust the nose pad 20 to a longest state. Subsequently, the user directly wears the glasses 100 in this state, and then by pressing the glasses 100 down, the nose applies a force to the nose pad 20, so that the nose pad 20 can be pushed up. In this case, the second bevel 2111 at the bottom of the locking slot 211 will push the first bevel 3222 on the positioning member 32, so that the positioning member 32 is pushed to the release position, and the nose pad 20 is capable of moving up. When the nose pad 20 moves up until the positioning member 32 corresponds to another pair of locking slots 211, the positioning member 32 returns to the positioning position under the elastic force of the first elastic element 40, so that the positioning member 32 is inserted into the locking slots 211. If the nose pad 20 is still not adjusted to the correct position at this time, one can continue to push the nose pad 20 and repeat the above action until the nose pad 20 is in the desired position.

To make adjustment easier and reduce hand actions, as shown in FIG. 3 and FIG. 4, in this embodiment, the adjustment mechanism 30 further includes a second elastic element 50 disposed in the groove 11 and disposed between the glasses frame 10 and the positioning section 21 of the nose pad 20, to provide the positioning section 21 with an elastic force. The second elastic element 50 is disposed between the glasses frame 10 and the positioning section 21 of the nose pad 20, so that a force of pushing out may be provided to the nose pad 20. In this way, after the pressing member 31 is pressed, the nose pad 20 does not need to be manually pulled out, and the nose pad 20 will be pushed out of the groove 11 under the elastic force of the second elastic element 50, which can save a procedure for the user to operate the adjustment.

The detailed structure of the positioning member 32 in this embodiment will be described in detail below. As shown in FIG. 2 to FIG. 4, the positioning member 32 includes a pushing part 321 and an insertion part 322. The pushing part 321 abuts the pressing member 31, and to make the pushing part 321 abut the pressing member 31 more reliably, the pressing member 31 in this embodiment includes a convex part 311, the pushing part 321 includes a through hole 3211, and the convex part 311 correspondingly penetrates through the through hole 3211. In another implementation, the convex part 311 and the through hole 3211 may also be omitted as long as the pushing part 321 and the pressing member 31 abut each other. In addition, the pushing part 321 extends upright. When the positioning member 32 moves from the release position to the positioning position, the pushing part 321 stops the positioning member 32 at the positioning position under stopping of the glasses frame 10.

The insertion part 322 is connected to the pushing part 321 and the insertion part 322 is perpendicular to the pushing part 321. When the positioning member 32 is located at the positioning position, the insertion part 322 is inserted into one pair of the locking slots 211. As shown in the exploded view of FIG. 3, the insertion part 322 extends from the left and right sides of the pushing part 321 to an arm-like mechanism. As shown in FIG. 2, the plurality of locking slots 211 is two-to-two correspondingly provided on the left and right sides of the limiting slot 212. When the positioning member 32 is located at the positioning position, the insertion part 322 is correspondingly inserted into the locking slots 211 located at the same height on the left and right sides of the limiting slot 212. Further, shapes of the locking slots 211 and the insertion part 322 may correspond to each other, so that the positioning member 32 is more easily and accurately inserted into the locking slots 211.

In addition, to make the connection between the positioning member 32 and the first elastic element 40 more accurate, the positioning member 32 may include a plate 323 connected to the rear of the insertion part 322. The shape or size of the plate 323 may be set according to the shape of the first elastic element 40. For example, if the first elastic element 40 in this embodiment is a spring with a circular cross section, the plate 323 may be circular and slightly larger than the diameter of the first elastic element 40, so that the plate 323 can reliably abut against the first elastic element 40.

In addition, a concave part 12 may be provided on the glasses frame 10 at a position adjacent to the plate 323. When the plate 323 is pushed to the right side of the figure under the elastic force of the first elastic element 40, the plate 323 can be stopped at the positioning position by the concave part 12, and the concave part 12 may also provide certain cushioning and stopping functions.

Figure 8:
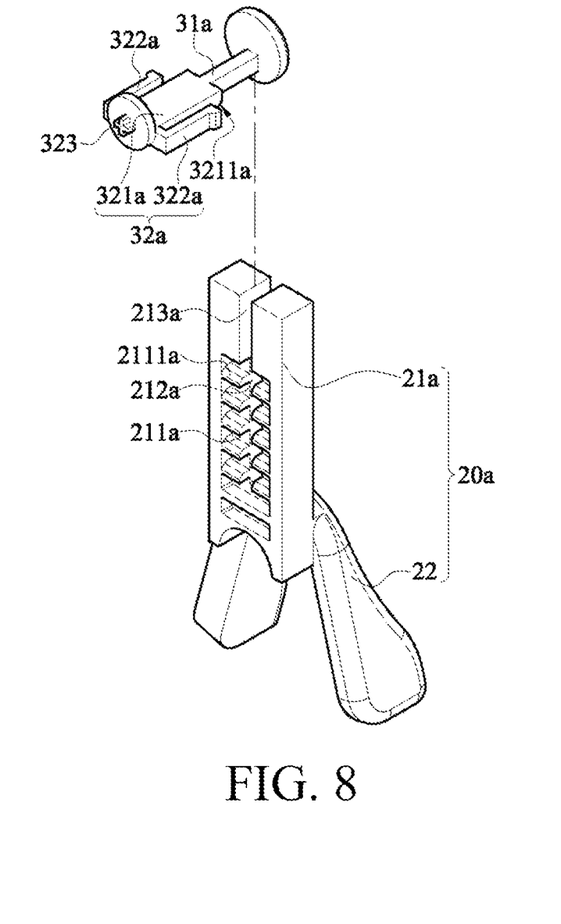
FIG. 8 is a partial exploded view of the glasses according to another embodiment of the application.
Figure 9:
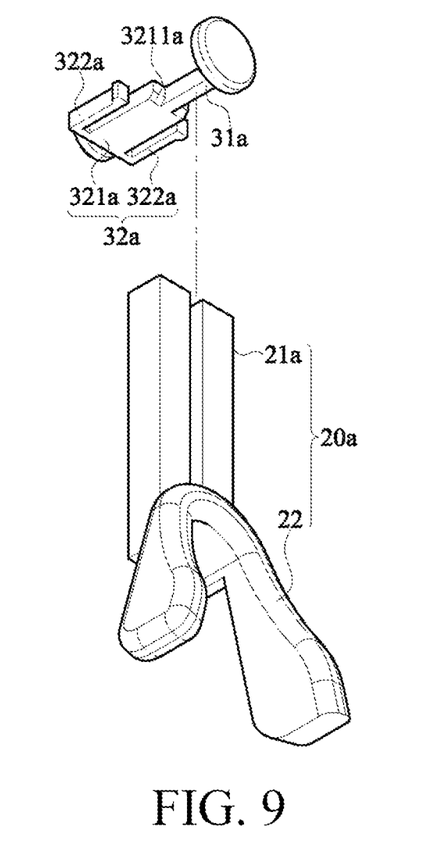
FIG. 9 is a partial exploded view of the glasses from another angle of view according to another embodiment of the application.
Figure 10:
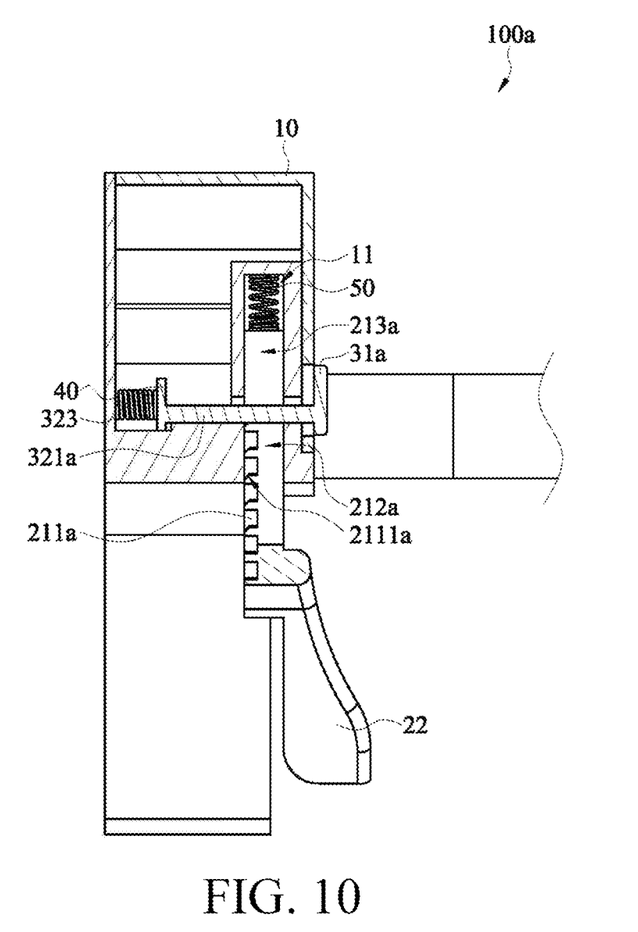
FIG. 10 is a cross-sectional view of the glasses taken along line 10-10 in FIG. 7 according to another embodiment of the application.
Figure 11:
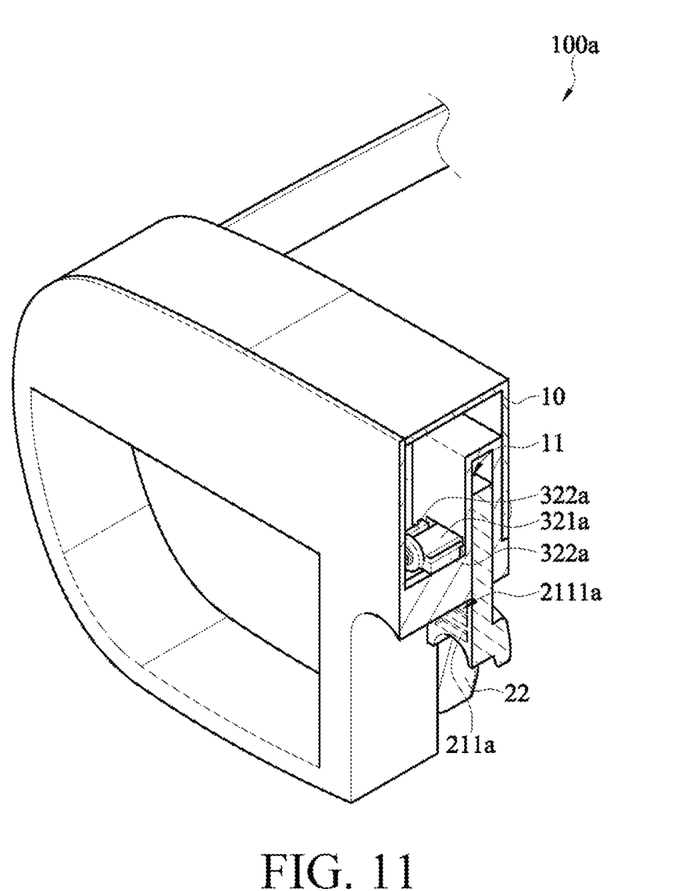
FIG. 11 is a cross-sectional view of the glasses according to another embodiment of the application.

Referring to FIG. 7 to FIG. 11, FIG. 7 is a partial three-dimensional perspective view of glasses according to another embodiment of the application; FIG. 8 is a partial exploded view of the glasses according to another embodiment of the application; FIG. 9 is a partial exploded view of the glasses from another angle of view according to another embodiment of the application; FIG. 10 is a cross-sectional view of the glasses taken along line 10-10 in FIG. 7 according to another embodiment of the application; and FIG. 11 is a cross-sectional view of the glasses according to another embodiment of the application. In this embodiment, the same elements and connection relationships as those in the previous embodiment will be represented by the same element symbols and will not be described repeatedly. Main differences between this embodiment and the previous embodiment are the structure of a nose pad 20a and the structure of a positioning member 32a, which will be described in detail below.

In this embodiment, each of the plurality of locking slots 211a of the positioning section 21a of the nose pad 20a of the glasses 100a has a fourth bevel 2111a at the bottom. The two locking slots 211a at the same height on the left and right sides are formed into a structure that is connected to each other with the limiting slot 212a, which is different from the previous embodiment in which the locking slots 211 are respectively provided on the left and right sides of the limiting slot 212 and are not connected. In addition, the positioning section 21a further includes an assembly port 213a provided above the corresponding limiting slot 212a, so that the pressing member 31a can penetrate through the assembly port 213a to the limiting slot 212a.

As shown in FIG. 8 and FIG. 9, the positioning member 32a of this embodiment includes a plug-in part 321a and a stopper. In this embodiment, the stopper is exemplified by two stopping parts 322a disposed at the left and right, so that a force is relatively even. In some implementations, only a single stopping part may be disposed to provide a stopping effect. The plug-in part 321a abuts the pressing member 31a and has a third bevel 3211a on the bottom surface of the front end of the plug-in part 321a. In this embodiment, the pressing member 31a and the positioning member 32a are an integral structure, and therefore, the pressing member 31a is directly connected to the front of the plug-in part 321a. In another implementation, the pressing member 31a and the positioning member 32a may still maintain a two-piece structure, as long as the pressing member 31a abuts the plug-in part 321a.

Referring to FIG. 8 and FIG. 9, the two stopping parts 322a of this embodiment are connected to the plug-in part 321a and respectively extend parallel to the two sides of the plug-in part 321a. When the positioning member 32a is at the positioning position, the plug-in part 321a is inserted into one of the locking slots 211a, and the two stopping parts 322a respectively abut against the glasses frame 10 adjacent to the locking slots 211a. When the positioning member 32a moves from the release position to the positioning position, the two stopping parts 322a stop the positioning member 32a at the positioning position under stopping of the glasses frame 10. As shown in FIG. 11, when the positioning member 32a is located at the positioning position, the two stopping parts 322a respectively abut against one side wall of the groove 11 of the glasses frame 10, to stop the positioning member 32a from moving towards the groove 11 continuously.

In addition, in this embodiment, a bottom surface of an end portion of the plug-in part 321a has a third bevel 3211a, and a bottom surface of each of the locking slots 211a has a fourth bevel 2111a. When the plug-in part 321a is inserted into one of the plurality of locking slots 211a, the third bevel 3211a corresponds to the fourth bevel 2111a. As mentioned above, by providing the third bevel 3211a and the fourth bevel 2111a, after the user wears the glasses 100a, by pressing the glasses 100a down, the nose applies a force to the nose pad 20, so that the nose pad 20 can be pushed up. In this case, the fourth bevel 2111a at the bottom of the locking slot 211a will push the third bevel 3211a on the positioning member 32a, so that the positioning member 32a is pushed to the release position, and the nose pad 20 is capable of moving up.

In summary, in any embodiment of the application, the adjustable nose pad 20 or 20a can be provided to enable the nose pad 20 or 20a to adjust its position up and down. In this way, multiple users with different nose shapes and nose bridge heights can be matched. In addition, an adjustment method is very simple. One only needs to press the pressing member 31 or 31a and adjust the nose pad 20 or 20a to a desired position, and then release the pressing member 31 or 31a and drive the positioning member 32 or 32a to return to an original position to be inserted into the nose pad 20 or 20a to fix the nose pad 20 or 20a to the desired position, thereby completing the position adjustment of the nose pad 20 or 20a. Only a pair of glasses 100 or 100a is needed to meet the needs of multiple users of most nose shapes and nose bridge heights.

Although the application has been disclosed by the foregoing embodiments, they are not used to limit the application. Various variations and modifications can be made by any person skilled in the art without departing from the spirit and scope of the application. Therefore, the protection scope of the application should be subject to the scope defined by the appended claims.

What is claimed is:

1. Glasses, comprising:
    a glasses frame, comprising a bridge, wherein the bridge has a groove provided in a vertical direction;
    a nose pad, comprising a positioning section and a support section, wherein the support section is connected to an end portion of the positioning section, the positioning section is slidably disposed in the groove, the positioning section has a plurality of locking slots and a limiting slot, and the locking slots are arranged in pairs of two on two opposite sides of the limiting slot; and
    an adjustment mechanism, disposed at the glasses frame, wherein the adjustment mechanism comprises:
    a pressing member, disposed perpendicular to the groove, wherein one end of the pressing member protrudes from one side of the groove, and the other end penetrates through the groove and the limiting slot; and
    a positioning member, disposed at the glasses frame and connected to the other end of the pressing member, wherein the positioning member is moved to a release position from a positioning position by pushing of the pressing member; when the positioning member is located at the positioning position, the positioning member is inserted into the locking slots located at the same height, and when the positioning member moves to the release position, the nose pad is moved in the groove along the limiting slot.

2. The glasses according to claim 1, wherein the adjustment mechanism further comprises a first elastic element disposed between the glasses frame and the positioning member, to provide the positioning member with an elastic force.

3. The glasses according to claim 2, wherein a bottom surface of an end portion of the positioning member has a first bevel, a bottom surface of each of the locking slots has a second bevel, and when the positioning member is inserted into one of the locking slots, the first bevel corresponds to the second bevel.

4. The glasses according to any of claims 1, wherein the adjustment mechanism further comprises a second elastic element disposed in the groove and disposed between the glasses frame and the positioning section of the nose pad, to provide the positioning section with an elastic force.

5. The glasses according to any of claims 1, wherein the positioning member comprises:
    a pushing part, abutting the pressing member; and
    an insertion part, connected to the pushing part, wherein the insertion part is perpendicular to the pushing part, and when the positioning member is located at the positioning position, the insertion part is inserted into the locking slots located at the same height.

6. The glasses according to claim 5, wherein the pressing member comprises a convex part, the pushing part comprises a through hole, and the convex part correspondingly penetrates through the through hole.

7. The glasses according to claim 5, wherein the insertion part extends from left and right sides of the pushing part, and when the positioning member is located at the positioning position, the insertion part is correspondingly inserted into the locking slots located at the same height on the left and right sides of the limiting slot.

8. The glasses according to claim 5, wherein a bottom surface of an end portion of the insertion part has a first bevel, a bottom surface of each of the locking slots has a second bevel, and when the insertion part is inserted into one of the locking slots, the first bevel corresponds to the second bevel.

9. The glasses according to any of claims 1, wherein the positioning member comprises:

a plug-in part, abutting the pressing member; and a stopper, connected to the plug-in part, wherein when the positioning member is located at the positioning position, the plug-in part is inserted into one of the locking slots, and the stopper abuts against the glasses frame adjacent to the locking slot.

10. The glasses according to claim 9, wherein a bottom surface of an end portion of the plug-in part has a third bevel, a bottom surface of each of the locking slots has a fourth bevel, and when the plug-in part is inserted into one of the locking slots, the third bevel corresponds to the fourth bevel.

11. The glasses according to claim 9, wherein the pressing member and the positioning member are an integral structure, the positioning section further comprises an assembly port provided above the limiting slot, and the pressing member penetrates through the assembly port to the limiting slot.

\* \* \* \* \*